(12) United States Patent
Ishida et al.

(10) Patent No.: US 11,951,831 B2
(45) Date of Patent: Apr. 9, 2024

(54) WORK VEHICLE

(71) Applicant: Yanmar Holdings Co., Ltd., Osaka (JP)

(72) Inventors: Hiroyasu Ishida, Osaka (JP); Tetsuya Iida, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/144,098

(22) Filed: May 5, 2023

(65) Prior Publication Data

US 2023/0364991 A1 Nov. 16, 2023

(30) Foreign Application Priority Data

May 10, 2022 (JP) ................................ 2022-077765

(51) Int. Cl.
*B60K 25/06* (2006.01)
(52) U.S. Cl.
CPC ......... *B60K 25/06* (2013.01); *B60Y 2200/223* (2013.01); *B60Y 2302/07* (2013.01)
(58) Field of Classification Search
CPC .......... B60K 25/06; B60K 1/04; B60K 17/28; B60Y 2200/223
See application file for complete search history.

(56) References Cited

U.S. PATENT DOCUMENTS

| | | | | |
|---|---|---|---|---|
| 7,431,108 B2* | 10/2008 | Tarasinski | ............... | B60K 17/28 |
| | | | | 180/53.6 |
| 10,094,470 B2* | 10/2018 | Omran | .................... | B60K 17/28 |
| 2004/0069544 A1* | 4/2004 | Brauer | .................... | A01D 90/14 |
| | | | | 180/53.4 |
| 2023/0010534 A1* | 1/2023 | Miyazaki | ................ | B60K 1/00 |

FOREIGN PATENT DOCUMENTS

JP 2004-68705 A 3/2004

* cited by examiner

*Primary Examiner* — Faye M Fleming
(74) *Attorney, Agent, or Firm* — NORTON ROSE FULBRIGHT US LLP

(57) ABSTRACT

A tractor includes an engine, a vehicle body, a rear PTO shaft, a central PTO shaft, a permission switch, and a control unit. The engine is configured to generate power. The vehicle body includes an operator's seat. The rear PTO shaft is configured to supply power generated by the engine to a rear work machine attached to a rear part of the vehicle body. The central PTO shaft is configured to supply power generated by the engine to a central work machine attached to a central part of the vehicle body. The permission switch is operable by an operator. The control unit indicates that the permission switch is operated as one of permission conditions for rotation of the rear PTO shaft after disembarkation, and indicates that the permission switch is operated as one of permission conditions for rotation of the central PTO shaft when moving backward.

11 Claims, 6 Drawing Sheets

WORK VEHICLE

CROSS-REFERENCE TO RELATED APPLICATIONS

This application claims priority under 35 U.S.C. § 119 to JP Application No. 2022-077765 filed May 10, 2022 the entire contents of which are hereby incorporated by reference.

TECHNICAL FIELD

The present invention relates primarily to a work vehicle including a rear PTO shaft and a central PTO shaft.

BACKGROUND ART

Patent document 1 discloses a tractor for performing stationary work. Stationary work means that the tractor is parked and a work machine attached to the tractor is driven to perform work. The tractor described in Patent Document 1 is provided with a seat sensor that detects seating on and leaving the operator's seat of an operator. The tractor has a function that stops an engine when leaving the operator's seat of an operator is detected while the engine is driven. This function may interfere with the stationary work. Therefore, in Patent document 1, when the operator's seat is in a non-use position, engine stopping is invalidated when leaving the operator's seat of an operator is detected. Thus, the stationary work can be performed while the operator leaves the operator's seat.

PRIOR ART DOCUMENT

Patent Document

Patent Document 1: Japanese Unexamined Patent Application Publication No. 2004-68705

SUMMARY OF INVENTION

Technical Problem

In Patent Document 1, in order to perform the stationary work, the operator's seat is required to be changed to a non-use position, which is troublesome for the operator. On the other hand, if some kind of operation tool is provided to permit the stationary work, there are issues in terms of space and operability because the number of operation tools provided by the work vehicle will increase.

The present invention was made in view of the above circumstances, and a main object of the present invention is to provide a work vehicle capable of performing stationary work with a configuration that simplifies the operations necessary for performing stationary work and other work.

Solution to Problem

The problem to be solved by the present invention is as described above, and the means for solving this problem and an advantageous effect thereof will be described below.

According to an aspect of the present invention, a work vehicle configured as below is provided. That is, the work vehicle includes a drive unit, a vehicle body, a rear PTO shaft, a central PTO shaft, a permission operation tool, and a control unit. The drive unit generates power. The vehicle body includes an operator's seat. The rear PTO shaft supplies power generated by the drive unit to a rear work machine attached to a rear part of the vehicle body. The central PTO shaft supplies power generated by the drive unit to a central work machine attached to a central part of the vehicle body. The permission operation tool is operable by an operator. The control unit sets the permission operation tool having been operated as one of permission conditions for rotation of the rear PTO shaft after disembarkation, and sets the permission operation tool having been operated as one of permission conditions for rotation of the central PTO shaft when moving backward.

Advantageous Effects of Invention

This allows a single permission operation tool to have two functions. These two functions are similar in concept in terms of permitting PTO shaft rotation, but are not used simultaneously. Therefore, by providing these two functions in a single permission operation tool, it is possible to realize easy-to-understand operation and a reduction in the number of operation tools.

It is preferable that the work vehicle described above has such a configuration as described below. That is, the work vehicle includes a seat sensor that detects that an operator is seated on the operator's seat. The control unit is capable of performing an automatic stop function that stops the drive unit when seating of an operator cannot be detected. The automatic stop function is invalidated by satisfying permission conditions for rotation of the rear PTO shaft after disembarkation.

Thus, even in a work vehicle having an automatic stop function, it is possible to drive a rear work machine after disembarkation.

It is preferable that the work vehicle described above has such a configuration as described below. That is, the control unit is capable of detecting whether or not the work vehicle is in a parking state. The control unit sets a fact that a parking state is detected after disembarkation during which the seat sensor does not detect seating of an operator as one of permission conditions for rotation of the rear PTO shaft after disembarkation.

Thus, it is possible to detect that the operator has disembarked and that the work vehicle is in a parking state.

It is preferable that the work vehicle described above has such a configuration as described below. That is, the work vehicle includes a forward and backward movement switching operation tool and a parking brake operation tool. The forward and backward movement switching operation tool can be operated to switch among forward, neutral, and backward. The parking brake operation tool switches between valid and invalid states of a parking brake. The control unit detects that the work vehicle is in a parking state when at least one of a fact that the forward and backward movement switching operation tool is switched to neutral and a fact that the parking brake operation tool has validated the parking brake is detected.

Thus, it is possible to detect whether or not the work vehicle is in a parking state simply by detecting an operation state of the operation tool.

In the work vehicle described above, it is preferable that the permission operation tool is located in a position where an operator seated on the operator's seat can operate the permission operation tool.

This allows an operator to operate the permission operation tool while the seat sensor detects seating of an operator.

It is preferable that the work vehicle described above has such a configuration as described below. That is, the work vehicle includes a PTO drive stop operation tool that switches between driving and stopping of the rear PTO shaft or the central PTO shaft. The permission operation tool and the PTO drive stop operation tool are located side by side.

Thus, two operation tools that are conceptually similar and close in timing of operation are located side by side, so that the operability can be enhanced.

In the work vehicle described above, it is preferable that the permission operation tool is located closer to a center in a vehicle width direction than the PTO drive stop operation tool.

Thus, the PTO drive stop operation tool may be operated by an operator who has disembarked, while the permission operation tool may be operated by an operator who is seated, so that the operability can be enhanced.

In the work vehicle described above, it is preferable that the permission operation tool emits light when rotation of the rear PTO shaft after disembarkation or rotation of the central PTO shaft when moving backward is valid.

Thus, the operator can be informed that rotation of the rear PTO shaft after disembarkation or rotation of the central PTO shaft when moving backward is valid.

It is preferable that the work vehicle described above has such a configuration as described below. That is, the work vehicle includes a PTO drive stop operation tool that switches between driving and stopping of the rear PTO shaft or the central PTO shaft. When the rear PTO shaft after disembarkation is rotating or the central PTO shaft when moving backward is rotating, if an operation to stop rotation of the rear PTO shaft or the central PTO shaft is performed to the PTO drive stop operation tool, the permission operation tool stops emitting light.

Thus, the operator can be informed that rotation of the rear PTO shaft after disembarkation, or rotation of the central PTO shaft when moving backward, is invalidated.

It is preferable that the work vehicle described above has such a configuration as described below. That is, the work vehicle includes an auxiliary housing and a base housing. The permission operation tool is attached to the auxiliary housing. The auxiliary housing is attached to the base housing.

Thus, it is possible to manufacture a work vehicle that does not adopt a permission operation tool simply by omitting the attachment of the auxiliary housing.

It is preferable that the work vehicle described above has such a configuration as described below. That is, a slit is formed in the base housing. A coupling is inserted in the slit. The auxiliary housing is attached to the base housing by the coupling.

Thus, when the attachment of the auxiliary housing is omitted, the appearance of the base housing is not so impaired because only a slit is formed in the base housing.

DESCRIPTION OF EMBODIMENTS

Figure 1:
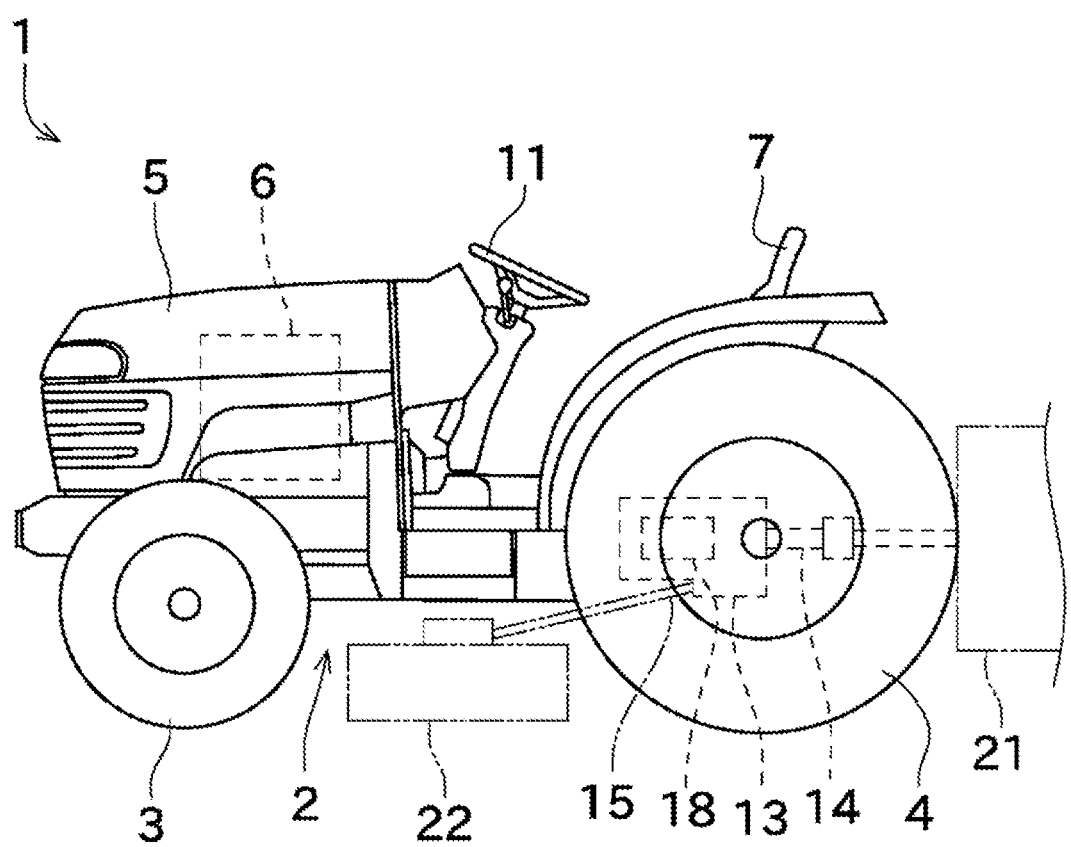
FIG. 1 is a side view of a tractor according to an embodiment of the present invention.
Figure 2:
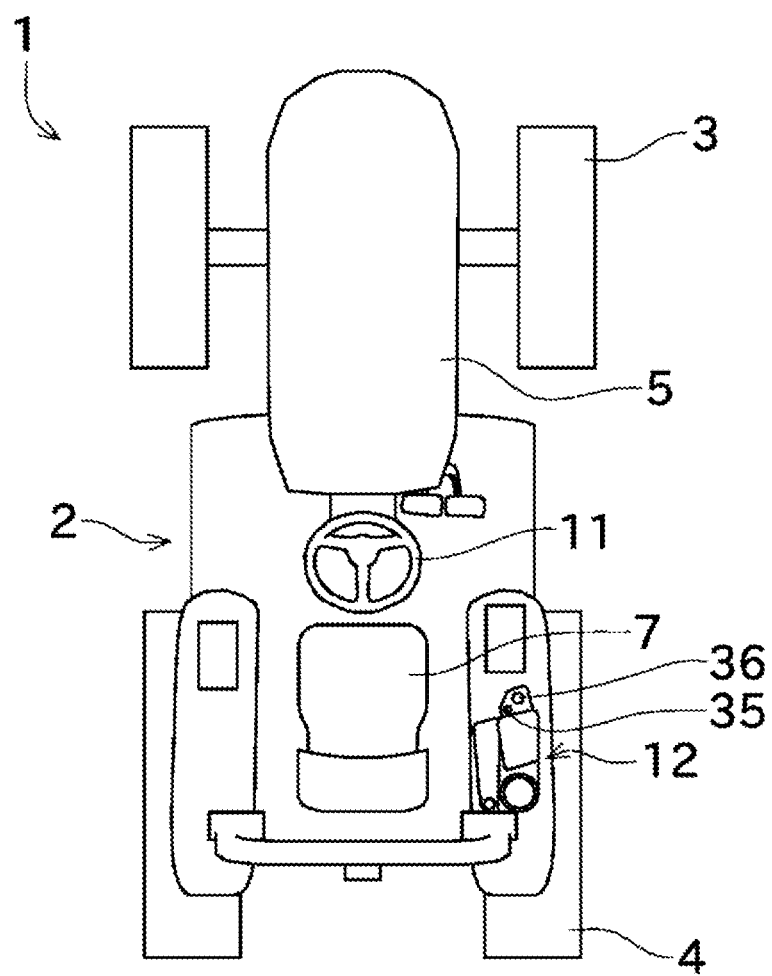
FIG. 2 is a plan view of the tractor.

Next, embodiments of the present invention will be described with reference to the drawings. FIG. 1 is a side view of a tractor (work vehicle) 1 according to an embodiment of the present invention. FIG. 2 is a plan view of the tractor 1. When "left," "right," and the like are used in the following description, these terms mean left and right as viewed from an operator seated in the tractor 1.

The tractor 1 of the present embodiment is a work vehicle used for agricultural or civil engineering work or other work. The tractor 1 includes a vehicle body 2, which is composed of a frame extending in a front-back direction and other components. The vehicle body 2 is supported by a front wheel 3 and a rear wheel 4 as traveling wheels. A pair of right and left front wheels 3 and a pair of right and left rear wheels 4 are provided, respectively.

At a front part of the tractor 1, a hood 5 is provided. Inside the hood 5, an engine 6 is provided as a drive unit. The engine 6 generates power. The engine 6 is a diesel engine, but may be a gasoline engine. In addition, instead of the engine 6, an electric motor may also be provided.

Behind the hood 5, there is provided an operator's seat 7 for an operator to seat. Various operation tools are provided around the operator's seat 7 for the operator to perform various operations. The operation tools include, for example, a steering wheel 11 and a switch box 12 illustrated in FIG. 1. The steering wheel 11 is an operation tool for steering the tractor 1. The switch box 12 is configured to include a plurality of switches. Details of the switch box 12 will be described below.

At a rear part of the vehicle body 2, a transmission case 13 is provided. The power output by the engine 6 is input to the transmission case 13. Inside the transmission case 13, a hydrostatic stepless transmission (HST), which is not illustrated in the figure, is located, and the power of the engine 6 is shifted by this HST and transmitted to rear wheels 4. This allows the tractor 1 to travel using the power output by the engine 6. Instead of the HST, an HMT or a mechanical transmission may be provided.

To the transmission case 13, a rear PTO shaft 14 and a central PTO shaft 15 are connected. Inside the transmission case 13, a power transmission mechanism 18 consisting of a hydraulic motor, hydraulic pump, and hydraulic valves is located, and the power of the engine 6 is transmitted to the rear PTO shaft 14 or the central PTO shaft 15 by this power transmission mechanism.

A rear work machine 21 is attached to the rear PTO shaft 14. The rear work machine 21 is attached to the rear part of the vehicle body 2 via the rear PTO shaft 14 and other attachment mechanisms. The rear work machine 21 performs work using power input from the rear PTO shaft 14. A central work machine 22 is attached to the central PTO shaft 15. The central work machine 22 is attached to a center part of the vehicle body 2 via the central PTO shaft 15 and other attachment mechanisms. The central work machine 22 performs work using power input from the central PTO shaft 15. Examples of the rear work machine 21 or the central work machine 22 include various work machine such as a cultivator, a plow, a fertilizer applicator, a mower, a seeder, a wood chipper, a pump, etc. In addition to the rear PTO shaft 14 and the central PTO shaft 15, the tractor 1 may include a front PTO shaft for driving a front work machine attached to a front part of the vehicle body 2.

Next, stationary work and backward work will be described. The stationary work is to perform the work by driving the rear work machine 21 attached to the tractor 1 while the tractor 1 is parked. The rear work machine 21 for performing the stationary work is, for example, a wood chipper or a pump. Normally, the operator disembarks from the tractor 1 to operate the rear work machine 21 or to supply work objects to the rear work machine 21. As described in detail below, the tractor 1 has an automatic stop function when leaving the seat of an operator. The automatic stop function when leaving the seat of an operator is a function that stops the engine 6 when detecting that the operator leaves the operator's seat 7. When the automatic stop function when leaving the seat of an operator is valid, the engine 6 and rear work machine 21 stop when the operator leaves the operator's seat 7, so the stationary work cannot be performed. Therefore, in the present embodiment, when the permission conditions for the stationary work described below are satisfied, the automatic stop function when leaving the seat of an operator is invalidated, and the stationary work can be performed.

The backward work is to perform the work by driving the central work machine 22 attached to the tractor 1 while moving the tractor 1 backward. The central work machine 22 for performing the backward work is, for example, a mower. The tractor 1 has an automatic stop function when moving backward. The automatic stop function when moving backward is a function that stops the central work machine 22 when an operation to move the tractor 1 backward is detected while the central work machine 22 is being driven. When the automatic stop function when moving backward is valid, the central work machine 22 stops at the timing when the backward movement is started, so that the backward work cannot be performed. Therefore, in the present embodiment, when the permission conditions for the backward work described below are satisfied, the automatic stop function when moving backward is invalidated and the backward work can be performed.

Figure 3:
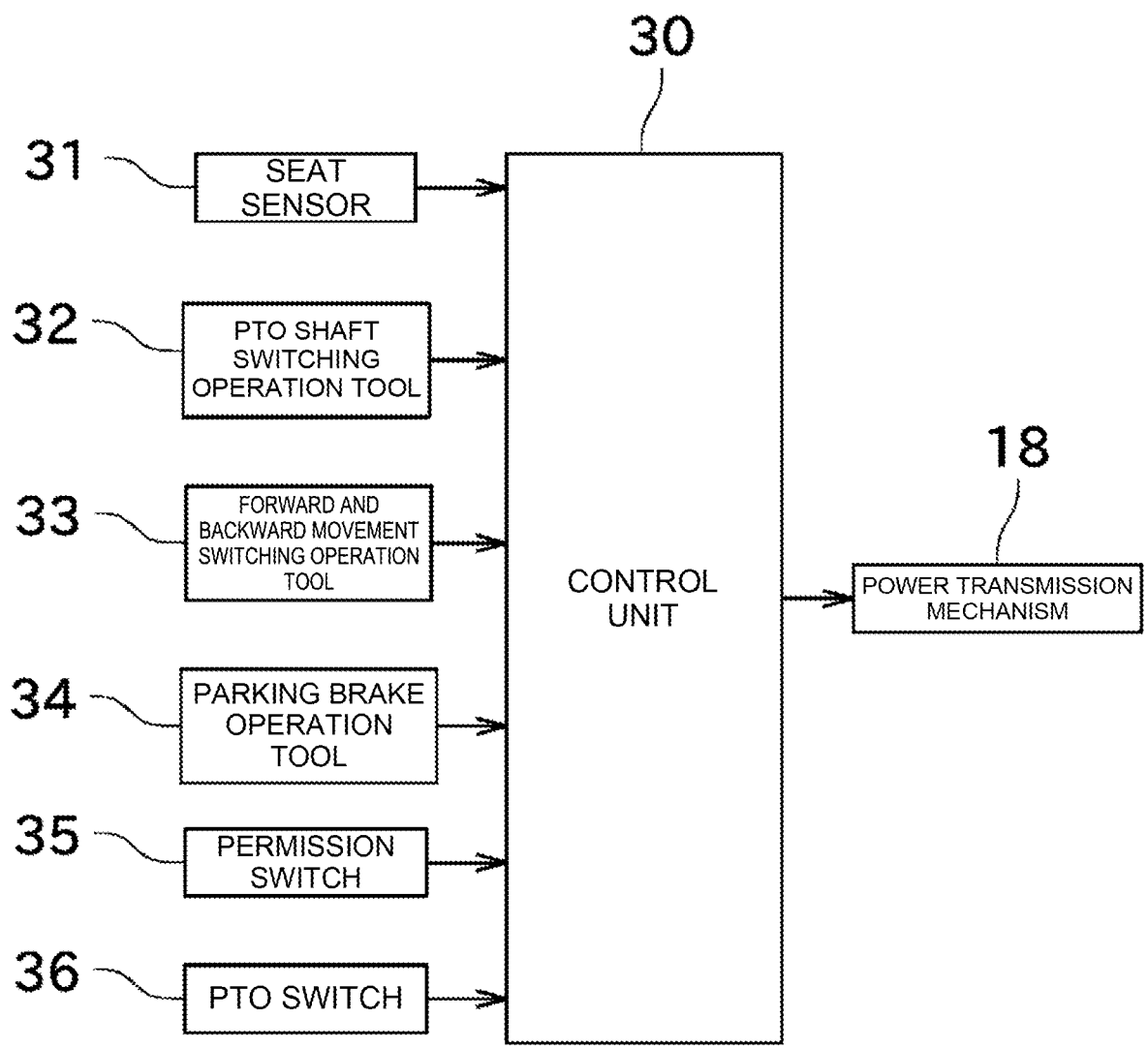
FIG. 3 is a block diagram of a configuration that controls a rear PTO clutch and a central PTO clutch.

Next, the equipment used in these processes related to the automatic stop function and invalidation thereof will be described. A control unit 30 illustrated in FIG. 3 is the equipment that executes the processing described above. The control unit 30 is located, for example, inside the hood 5. The control unit 30 is a computer equipped with an arithmetic unit such as a CPU and a memory device such as HDD, SSD, or flash memory. By executing a program stored in the memory device by the arithmetic unit, the control unit 30 can perform the processing described above.

As illustrated in FIG. 3, the tractor 1 includes a seat sensor 31. The seat sensor 31 is located inside or below a seat part of the operator's seat 7. The seat sensor 31 becomes an on state when a load is applied, and automatically becomes an off state when the load is released. With this configuration, the seat sensor 31 becomes an on state while the operator is seated on the operator's seat 7. The seat sensor 31 outputs a signal to the control unit 30 indicating an on state or an off state.

The tractor 1 includes a PTO shaft switching operation tool 32, a forward and backward movement switching operation tool 33, and a parking brake operation tool 34, a permission switch (permission operation tool) 35, and a PTO switch (PTO drive stop operation tool) 36, as the operation tools mentioned above. These operation tools are located at positions where an operator seated on the operator's seat 7 can operate these operation tools, specifically, on the steering column, above the fenders of the left and right rear wheels 4, below the operator's seat 7, or on the floor. These operation tools include, for example, a lever, a switch, a button, or a pedal. Position sensors are provided on a position switching operation tool, such as a lever or a slide switch, which detects a position of the operation tool and outputs the detected position to the control unit 30.

The PTO shaft switching operation tool 32 is an operation tool for switching the PTO shaft to be driven. By operating the PTO shaft switching operation tool 32, a state in which the rear PTO shaft 14 is driven and a state in which the central PTO shaft 15 is driven can be switched. Specifically, the power transmission mechanism 18 is provided inside the transmission case 13. The power transmission mechanism 18 includes, for example, a solenoid valve for switching a hydraulic path, and can change the PTO shaft to which power is transmitted on the basis of control by the control unit 30. The PTO shaft to which power is transmitted may be changed by a mechanical structure using gears, or the like, instead of a solenoid valve. The PTO shaft switching operation tool 32 is capable of switching between a position which indicates the rear PTO shaft 14 and a position which indicates the central PTO shaft 15. When the PTO shaft switching operation tool 32 is in the position which indicates the rear PTO shaft 14, power generated by the engine 6 is transmitted to the rear PTO shaft 14. On the other hand, when the PTO shaft switching operation tool 32 is in the position which indicates the central PTO shaft 15, power generated by the engine 6 is transmitted to the central PTO shaft 15.

The forward and backward movement switching operation tool 33 is an operation tool for switching a traveling direction of the tractor 1. By operating the forward and backward movement switching operation tool 33, a direction of rotation of an axle, or whether or not power is transmitted to the axle, is changed. Thus, the forward and backward movement switching operation tool 33 is capable of switching among a state in which the tractor 1 moves forward, a state in which the tractor 1 moves backward, and a state in which power is not supplied to the wheels of the tractor 1 (neutral).

The parking brake operation tool 34 is an operation tool for switching the parking brake between valid and invalid. By operating the parking brake operation tool 34, the rear wheels 4 are braked. The parking brake is used after the tractor 1 is parked.

The permission switch 35 is located on one side (right side) of the operator's seat 7 in the vehicle width direction. The permission switch 35 is a push type switch, and the operator operates the permission switch 35 by pressing the permission switch 35. Operating permission switch 35 is one of the conditions for permitting the stationary work and the backward work described above. The permission switch 35 is an operation tool to inform the tractor 1 side that the operator has an intention to perform stationary work and backward work. By providing the permission switch 35, the automatic stop function can be invalidated when the operator intends stationary work or backward work, while the automatic stop function can be validated when the operator does not intend stationary work or backward work. The permission switch 35 is a light-emitting switch, which emits light when the automatic stop function is invalidated (in other words, when stationary work or backward work is permitted).

Thus, the permission switch 35 has both a function as an operation tool to indicate to the tractor 1 that stationary work is intended and a function as an operation tool to indicate to the tractor 1 that backward work is intended. Here, the work machine driven when performing stationary work is only the rear work machine 21, and no stationary work is performed using the central work machine 22. Therefore, if the permission switch 35 is operated when the PTO shaft to be driven is the rear PTO shaft 14, it is considered that the operator intends stationary work. On the other hand, the work machine that is a target of the automatic stop function when moving backward is only the central work machine 22, and it is not necessary to operate the automatic stop function for the rear work machine 21. Therefore, if the permission switch 35 is operated when the PTO shaft to be driven is the central PTO shaft 15, it is considered that the operator intends backward work. Considering the above, the control unit 30 differentiates the processing when the permission switch 35 is operated depending on that the PTO shaft to be driven is the rear PTO shaft 14 or the central PTO shaft 15.

The PTO switch 36 is an operation tool for switching the driving of the PTO shaft between on and off. When the PTO shaft switching operation tool 32 in the position which indicates the rear PTO shaft 14, by operating the PTO switch 36, the state of the power transmission mechanism 18 is changed, so that the driving of the rear PTO shaft 14 is switched between on and off. When the PTO shaft switching operation tool 32 in the position which indicates the central PTO shaft 15, by operating the PTO switch 36, the state of the power transmission mechanism 18 is changed, so that the driving of the central PTO shaft 15 is switched between on and off.

Figure 4:
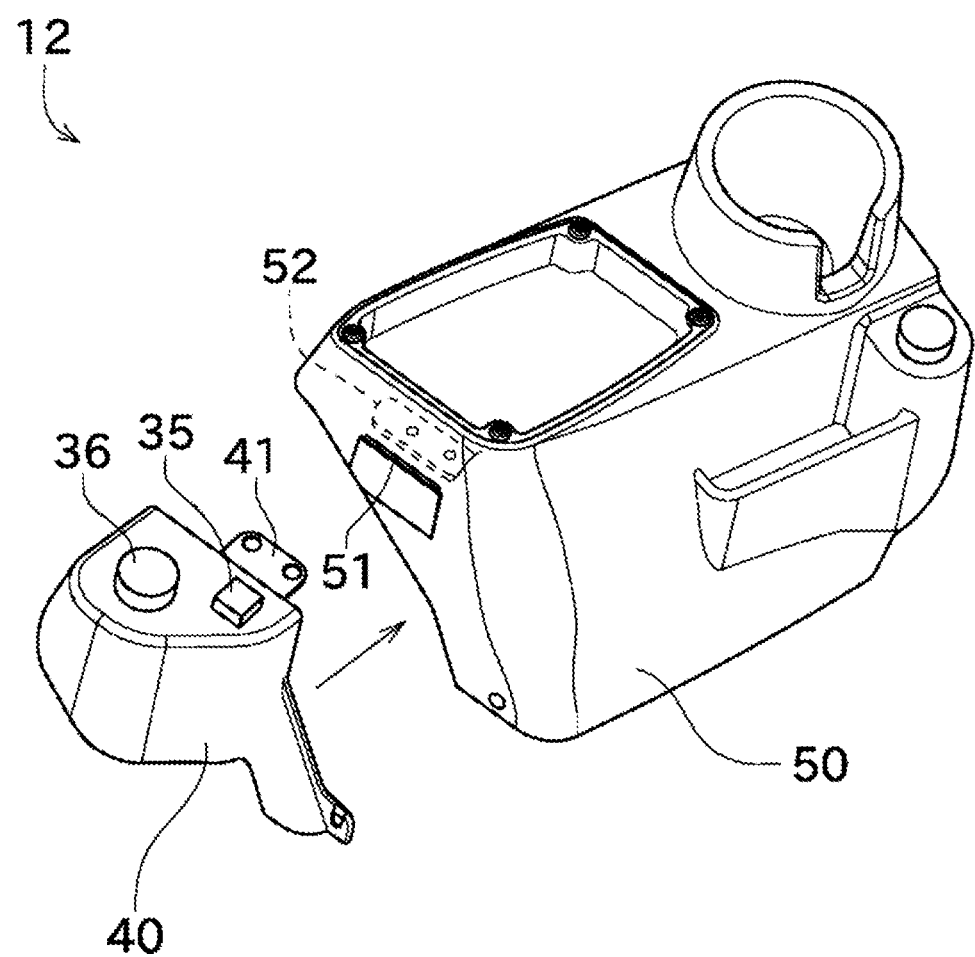
FIG. 4 is a perspective view of a base housing and an auxiliary housing.

As illustrated in FIG. 2, the permission switch 35 and the PTO switch 36 are located side by side in the switch box 12. As illustrated in FIG. 4, the switch box 12 includes an auxiliary housing 40 and a base housing 50. The base housing 50 is attached to the vehicle body 2 (for example, rear wheel fender). The base housing 50 is provided with switches and a glove compartment. A surface of the base housing 50 has a slit 51 for attaching the auxiliary housing 40. An attaching fixture 52 is provided inside the base housing 50. The attaching fixture 52 has a through hole. The attaching fixture 52 is used to attach the auxiliary housing 40 to the base housing 50.

The auxiliary housing 40 is provided with the permission switch 35 and the PTO switch 36. As illustrated in FIG. 2, the permission switch 35 is located closer to a center in the vehicle width direction than the PTO switch 36. The auxiliary housing 40 is provided with a coupling 41. A through hole is formed in the coupling 41. By inserting the coupling 41 into the slit 51, the position of the through hole in the coupling 41 can be aligned with the position of the through hole in the attaching fixture 52. The coupling 41 can then be fixed to the attaching fixture 52 by using bolts or other fasteners. The auxiliary housing 40 can then be attached and fastened to the base housing 50 by using bolts or other fasteners at other locations.

If the tractor 1 is manufactured with a configuration that does not require the permission switch 35 and PTO switch 36, the auxiliary housing 40 itself is not required. If one surface of the base housing 50 is open and the opening is covered by the auxiliary housing 40, a cover member is required to cover the opening if the auxiliary housing 40 is omitted. In this regard, in the present embodiment, an opening surface is not formed in the base housing 50, but the slit 51 is formed instead. Since the slit 51 is in a linear shape, the opening area is small, so the cover member can be omitted or downsized.

Figure 5:
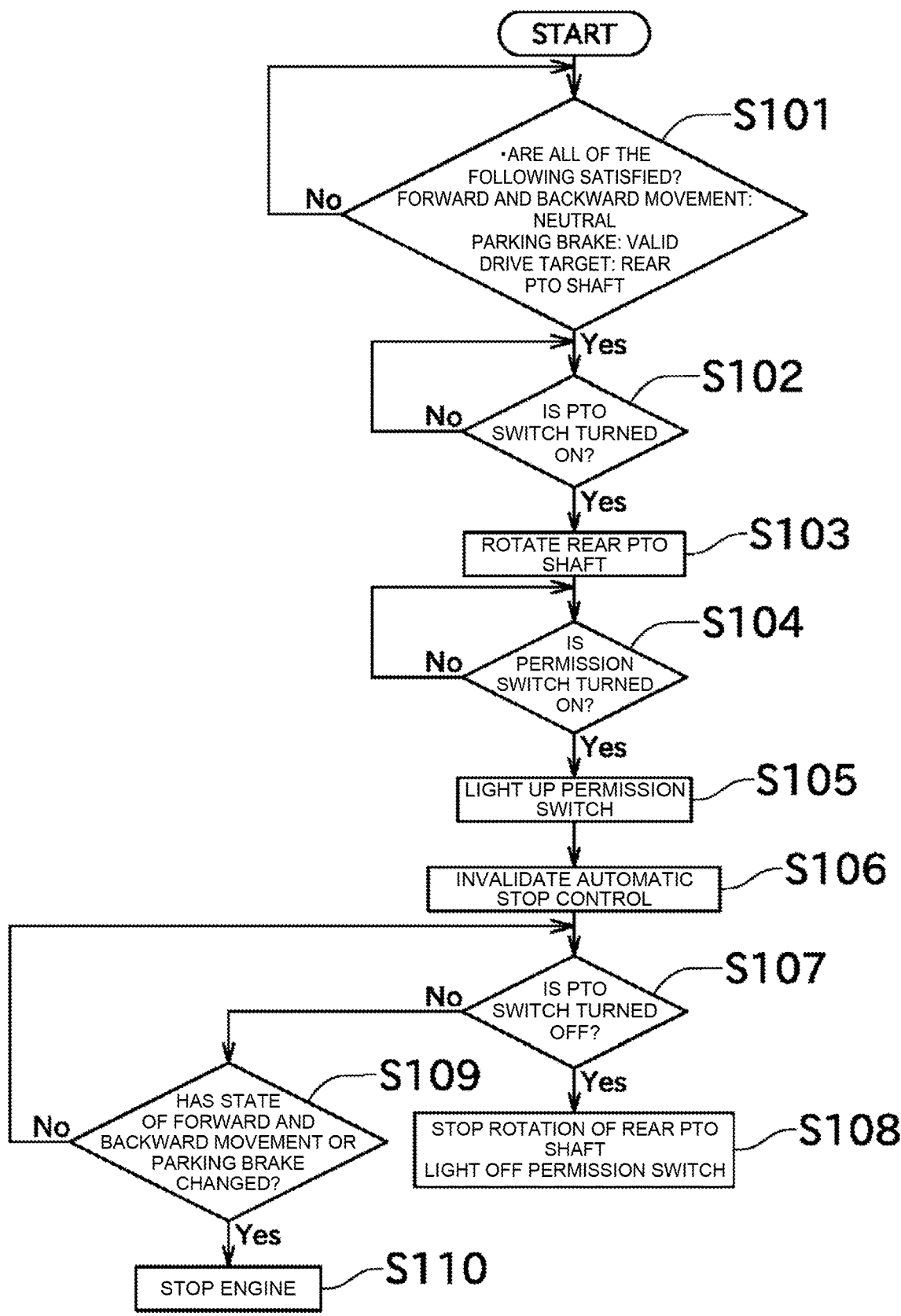
FIG. 5 is a flowchart illustrating processing related to stationary work using a rear work machine.

Next, with reference to FIG. 5, stationary work from start to end will be described in order. FIG. 5 is a flowchart illustrating processing related to stationary work using the rear work machine 21.

First, a flow of processing to be performed by the operator will be described. The operator moves the tractor 1 to a location where the stationary work is to be performed and parks the tractor 1. At this point, the operator is seated on the operator's seat 7 and the engine 6 is in operation. After parking the tractor 1, the operator sets the forward and backward movement switching operation tool 33 to neutral and operates the parking brake operation tool 34 to validate the parking brake. If the PTO shaft to be driven is the central PTO shaft 15, the operator operates the PTO shaft switching operation tool 32 to switch the PTO shaft to be driven to the rear PTO shaft 14. Next, the operator turns on the permission switch 35 and the PTO switch 36, and then begins the stationary work with the rear work machine 21.

The operator turns off PTO switch 36 after completing the stationary work. In the present embodiment, the PTO switch 36 is located outside the permission switch 35 in the vehicle width direction, making it easier to operate from outside the tractor 1. The operator may operate the PTO switch 36 after being seated on the operator's seat 7 of tractor 1.

Next, processes performed by the control unit 30 will be described. First, the control unit 30 determines whether or not all of the following conditions 1 to 3 are satisfied (S101). Condition 1 is that the state of the forward and backward movement is neutral, condition 2 is that the parking brake is valid, and condition 3 is that the drive target is the rear PTO shaft 14. The control unit 30 determines whether or not the condition 1 is satisfied on the basis of the operation state of the forward and backward movement switching operation tool 33. The control unit 30 determines whether or not the condition 2 is satisfied on the basis of the operation state of the parking brake operation tool 34. The control unit 30 determines whether or not the condition 3 is satisfied on the basis of the operation state of the PTO shaft switching operation tool 32. These determination methods are examples, and either the condition 1 or the condition 2 may be omitted, for example.

After the control unit 30 determines that the conditions 1 to 3 are satisfied, the control unit 30 determines whether or not the PTO switch 36 is turned on (S102). When the control unit 30 determines that the PTO switch 36 is turned on, the control unit 30 rotates and drives the rear PTO shaft 14 (S103).

Next, the control unit 30 determines whether or not the permission switch 35 is turned on (S104). When the control unit 30 determines that the permission switch 35 is turned on, the control unit 30 lights up the permission switch 35 (S105) and invalidates automatic stop control when leaving seat (S106). By invalidating the automatic stop control when leaving seat, the engine 6 does not stop even if the operator leaves the operator's seat 7 and the seat sensor 31 turns off. Thus, the operator can perform the stationary work. The operator can easily know that the automatic stop control is invalidated and the stationary work can be performed by confirming that the PTO switch 36 lights. If the conditions determined in steps S101, S102, and S104 (permission conditions for permitting stationary work) are not satisfied, the permission switch 35 does not light up and the automatic stop control is not invalidated.

Next, the control unit 30 determines whether or not the PTO switch is turned off (S107). When the control unit 30 determines that the PTO switch is turned off, the control unit 30 stops rotation of the rear PTO shaft 14 and lights off the permission switch (S108). The control unit 30 also determines whether or not the state of the forward and backward movement or the parking brake has changed (S109). For example, when the forward and backward movement switching operation tool 33 points forward or backward in response to an operation of the operator, or when the parking brake is invalidated, the control unit 30 stops the engine 6 (S110) because there is a risk that the tractor 1 may travel in a state where the rear work machine 21 is driven in the stationary work.

Figure 6:
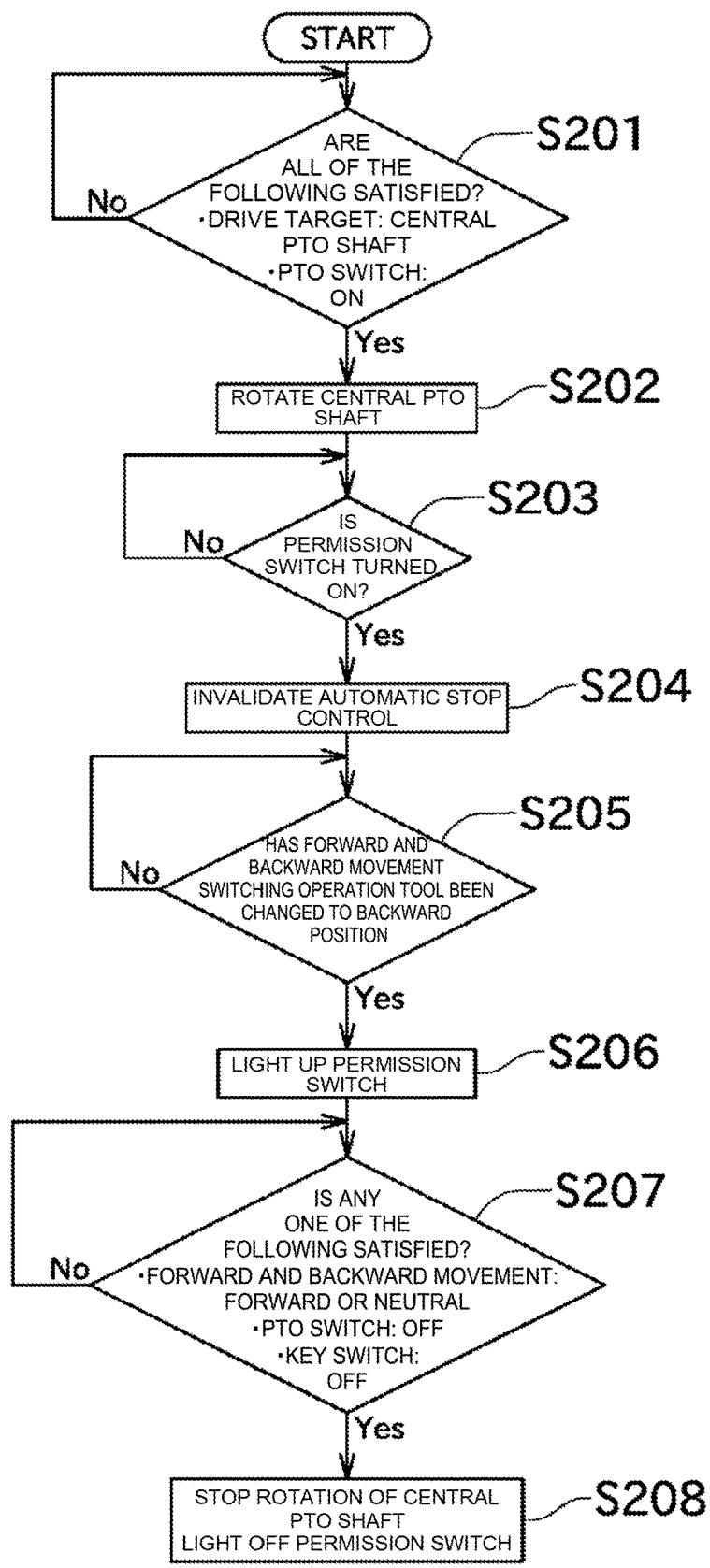
FIG. 6 is a flowchart illustrating a process related to backward work using a central work machine.

Next, with reference to FIG. 6, backward work from start to end will be described in order. FIG. 6 is a flowchart illustrating a process related to backward work using the central work machine 22.

First, a flow of processing to be performed by the operator will be described. The operator moves the tractor 1 to a location where the backward work is to be started and stops the tractor 1 temporarily. Next, if the PTO shaft to be driven is the rear PTO shaft 14, the PTO shaft to be driven is switched to the central PTO shaft 15 by operating the PTO shaft switching operation tool 32. Next, the operator turns on the permission switch 35 and the PTO switch 36, and then starts backward work using the central work machine 22 while moving the tractor 1 backward. After completing the backward work, the operator moves the tractor 1 forward, or stops the tractor 1, or turns off the PTO switch 36, or turns off the key switch.

Next, processes performed by the control unit 30 will be described. First, the control unit 30 determines whether all of the following conditions a and b are satisfied (S201). Condition a is that the drive target is the central PTO shaft 15. Condition b is that the PTO switch 36 is on. The control unit 30 determines whether or not the condition a is satisfied on the basis of the operation state of the PTO shaft switching operation tool 32. The control unit 30 determines whether or not the condition b is satisfied on the basis of the operation state of the PTO switch 36.

When the control unit 30 determines that conditions a and b are satisfied, the control unit 30 rotates and drives the central PTO shaft 15 (S202). Next, the control unit 30 determines whether or not the permission switch 35 is turned on (S203). When the control unit 30 determines that the permission switch 35 is turned on, the control unit 30 invalidates the automatic stop control when moving backward (S204). Thus, it is possible to perform backward work even if the tractor 1 moves backward in a state where the central PTO shaft 15 is driven, because the central PTO shaft 15 does not stop.

The control unit 30 also determines whether or not the forward and backward movement switching operation tool 33 has been changed to a backward position (S205), and when the control unit 30 determines that the forward and backward movement switching operation tool 33 has been changed to the backward position, the control unit 30 lights up the permission switch (S206). Since the automatic stop control when moving backward is invalidated as described above, rotation of the central PTO shaft 15 does not stop even when the forward and backward movement switching operation tool 33 is changed to the backward position. The operator can easily know that the automatic stop control is invalidated and the backward work can be performed by confirming that the permission switch 35 lights. If the conditions determined in steps S201, S203, and S205 (permission conditions for permitting backward work) are not satisfied, the permission switch 35 does not light and the automatic stop control is not invalidated. The tractor 1 then moves backward to perform the backward work.

Next, the control unit 30 determines whether or not at least any one of the following conditions A to C is satisfied (S207). Condition A is that the state of the forward and backward movement is forward or neutral, condition B is that the PTO switch 36 is off, and condition C is that the key switch is off. The control unit 30 determines whether or not the condition A is satisfied on the basis of the operation state of the forward and backward movement switching operation tool 33. The control unit 30 determines whether or not the condition B is satisfied on the basis of the operation state of the PTO switch 36. The control unit 30 determines whether or not the condition C is satisfied on the basis of the operation state of the key switch. When the control unit 30 determines that at least any one of the above conditions A through C is satisfied, the control unit 30 stops rotation of the central PTO shaft 15 and lights off the permission switch 35 (S208).

As described above, the tractor 1 of the present embodiment has the following feature 1. That is, the tractor 1 includes the engine 6, the vehicle body 2, the rear PTO shaft 14, the central PTO shaft 15, the permission switch 35, and the control unit 30. The engine 6 generates power. The vehicle body 2 includes the operator's seat 7. The rear PTO shaft 14 supplies power generated by the engine 6 to the rear work machine 21, which is attached to a rear part of the vehicle body 2. The central PTO shaft 15 supplies power generated by the engine 6 to the central work machine 22, which is attached to a central part of the vehicle body 2. The permission switch 35 is operable by an operator. The control unit 30 sets a fact that the permission switch 35 is operated as one of permission conditions for rotation of the rear PTO shaft 14 after disembarkation, and sets a fact that the permission switch 35 is operated as one of permission conditions for rotation of the central PTO shaft 15 when moving backward.

This allows a single permission switch 35 to have two functions. These two functions are similar in concept in terms of PTO shaft rotation, but are not used simultaneously. Therefore, by providing these two functions in a single permission switch 35, it is possible to realize easy-to-understand operation and a reduction in the number of operation tools.

The tractor 1 of the present embodiment further has the following feature 2. That is, the tractor 1 includes a seat sensor 31 that detects that an operator is seated on the operator's seat 7. The control unit 30 is capable of performing an automatic stop function that stops the engine 6 when seating of an operator cannot be detected. The automatic stop function is invalidated by satisfying the permission conditions for rotation of the rear PTO shaft 14 after disembarkation.

Thus, even in the tractor 1 having an automatic stop function, it is possible to drive the rear work machine 21 after disembarkation.

The tractor 1 of the present embodiment further has the following feature 3. That is, the control unit 30 is capable of detecting whether or not the tractor 1 is in a parking state. The control unit 30 sets a fact that a parking state is detected after disembarkation during which the seat sensor 31 does not detect seating of an operator as one of permission conditions for rotation of the rear PTO shaft 14 after disembarkation.

Thus, it is possible to detect that the operator has disembarked and that the tractor 1 is in a parking state.

The tractor 1 of the present embodiment further has the following feature 4. That is, the tractor 1 includes the forward and backward movement switching operation tool 33 and the parking brake operation tool 34. The forward and backward movement switching operation tool 33 can be operated to switch among forward, neutral, and backward. The parking brake operation tool 34 switches between valid and invalid states of a parking brake. The control unit 30 detects that the tractor 1 is in a parking state when at least one of a fact that the forward and backward movement switching operation tool 33 is switched to neutral and a fact that the parking brake operation tool 34 has validated the parking brake is detected.

Thus, it is possible to detect whether or not the tractor 1 is in a parking state simply by detecting an operation state of the operation tool.

The tractor 1 of the present embodiment further has the following feature 5. That is, in the tractor 1, the permission switch 35 is located at a position where an operator seated on the operator's seat 7 can operate the permission switch 35.

This allows the operator to operate the permission switch 35 while the seat sensor 31 detects that seating of the operator. Therefore, the automatic stop control can be invalidated while the operator is seated.

The tractor 1 of the present embodiment further has the following feature 6. That is, the tractor 1 includes the PTO switch 36 that switches between driving and stopping of the rear PTO shaft 14 or the central PTO shaft 15. The permission switch 35 and the PTO switch 36 are located side by side.

Thus, two operation tools that are conceptually similar and close in timing of operation are located side by side, so that the operability can be enhanced.

The tractor 1 of the present embodiment further has the following feature 7. That is, in the tractor 1, the permission switch 35 is located closer to a center in a vehicle width direction than the PTO switch 36.

Thus, the PTO switch 36 may be operated by an operator who has disembarked, while the permission switch 35 may be operated by an operator who is seated, so that the operability can be enhanced.

The tractor 1 of the present embodiment further has the following feature 8. That is, in the tractor 1, the permission switch 35 emits light when rotation of the rear PTO shaft 14 after disembarkation or rotation of the central PTO shaft 15 when moving backward is valid.

Thus, the operator can be informed that rotation of the rear PTO shaft 14 after disembarkation or rotation of the central PTO shaft 15 when moving backward is valid.

The tractor 1 of the present embodiment further has the following feature 9. That is, the tractor 1 includes the PTO switch 36 that switches between driving and stopping of the rear PTO shaft 14 or the central PTO shaft 15. During rotation of the rear PTO shaft 14 after disembarkation or during rotation of the central PTO shaft 15 when moving backward, if an operation to stop rotation of the rear PTO shaft 14 or the central PTO shaft 15 is performed to the PTO switch 36, the permission switch 35 stops emitting light.

Thus, the operator can be informed that rotation of the rear PTO shaft 14 after disembarkation, or rotation of the central PTO shaft 15 when moving backward, is invalidated.

The tractor 1 of the present embodiment further has the following feature 10. That is, the tractor 1 includes the auxiliary housing 40 and the base housing 50. The permission switch 35 is attached to the auxiliary housing 40. The auxiliary housing 40 is attached to the base housing 50.

Thus, it is possible to manufacture the tractor 1 that does not adopt the permission switch 35 simply by omitting the attachment of the auxiliary housing 40.

The tractor 1 of the present embodiment further has the following feature 11. That is, in the tractor 1, the slit 51 is formed in the base housing 50. The coupling 41 is inserted in the slit 51. The auxiliary housing 40 is attached to the base housing 50 by the coupling 41.

Thus, when the attachment of the auxiliary housing 40 is omitted, the appearance of the base housing 50 is not so impaired because only the slit 51 is formed in the base housing 50.

The features 1 to 11 described above can be appropriately combined as long as no inconsistency occurs. For example, the feature 3 can be combined with at least one of the features 1 and 2. The feature 4 can be combined with at least one of the features 1 to 3. The feature 5 can be combined with at least one of the features 1 to 4. The feature 6 can be combined with at least one of the features 1 to 5. The feature 7 can be combined with at least one of the features 1 to 6. The feature 8 can be combined with at least one of the features 1 to 7. The feature 9 can be combined with at least one of the features 1 to 8. The feature 10 can be combined with at least one of the features 1 to 9. The feature 11 can be combined with at least one of the features 1 to 10.

The preferred embodiments of the present invention are described above; however, the aforementioned configurations may be modified, for example, as follows.

In the above embodiment, the permission switch 35 and the PTO switch 36 are push type operation tools, but the permission switch 35 and the PTO switch 36 could be operation tools having an other configuration. The operation tool having an other configuration include, for example, a lever type operation tool or a pedal type operation tool. Alternatively, the operation tool having an other configuration may be a touch-panel operation tool that is operated by touching the display.

The flowcharts indicated in the above embodiment are one example, and a part of the processing may be omitted, a part of the processing may be changed, or new processing may be added. For example, in the flowchart in FIG. 5, the order of the process of determining the ON of the PTO switch 36 and rotating and driving the rear PTO shaft 14 and the process of determining the ON of the permission switch 35 and lighting up the PTO switch 36 may be interchanged. In the flowchart in FIG. 6, the permission switch 35 may be lighted up while the automatic stop control is invalidated at the same time.

The above embodiments describe examples in which the present invention is applied to a tractor, but the present invention can also be applied to a work vehicle other than a tractor, such as a rice transplanter or other agricultural work vehicle, or a hydraulic excavator or other work vehicle for construction or civil engineering.

REFERENCE SIGNS LIST

1: Tractor (work vehicle)
2: Vehicle body
6: Engine (drive unit)
7: operator's seat
14: Rear PTO shaft
15: Central PTO shaft
21: Rear work machine
22: Central work machine
30: Control unit
31: Seat sensor
33: Forward and backward movement switching operation tool
34: Parking brake operation tool
36: PTO switch (PTO drive stop operation tool)
40: Auxiliary housing
50: Base housing 51: Slit
35: Permission switch (permission operation tool)

The invention claimed is:

1. A work vehicle comprising:
   a drive unit configured to generate power;
   a vehicle body that includes a seat associated with an operator;
   a rear PTO shaft configured to supply the power generated by the drive unit to a rear work machine attached to a rear part of the vehicle body;
   a central PTO shaft configured to supply the power generated by the drive unit to a central work machine attached to a central part of the vehicle body;
   a permission operation tool that is operable by the operator; and
   a control unit configured to indicate:
      the permission operation tool is operated as one of multiple permission conditions for rotation of the rear PTO shaft after disembarkation, and
      the permission operation tool is operated as one of multiple permission conditions for rotation of the central PTO shaft when moving backward.

2. The work vehicle according to claim 1, further comprising:
   a seat sensor configured to detect that the operator is seated on the seat,
   wherein:
      the control unit is configured to perform an automatic stop function that stops the drive unit when seating of the operator cannot be detected, and
      the automatic stop function is invalidated by satisfying any of the multiple permission conditions for rotation of the rear PTO shaft after disembarkation.

3. The work vehicle according to claim 2, wherein:
   the control unit is configured to detect whether or not the work vehicle is in a parking state, and
   the control unit is configured to indicate that a parking state is detected after disembarkation during which the seat sensor does not detect seating of the operator as one of the multiple permission conditions for rotation of the rear PTO shaft after disembarkation.

4. The work vehicle according to claim 1, further comprising:
   a forward and backward movement switching operation tool configured to be operated to switch among forward, neutral, and backward; and
   a parking brake operation tool configured to switch between valid and invalid states of a parking brake, and
   wherein the control unit is configured to detect that the work vehicle is in a parking state when the forward and backward movement switching operation tool is switched to neutral or the parking brake operation tool has validated the parking brake is detected.

5. The work vehicle according to claim 1, wherein the permission operation tool is located in a position where the operator seated on the seat can operate the permission operation tool.

6. The work vehicle according to claim 1, further comprising:
   a PTO drive stop operation tool configured to switch between driving and stopping of the rear PTO shaft or the central PTO shaft, and
   wherein the permission operation tool and the PTO drive stop operation tool are located side by side.

7. The work vehicle according to claim 6, wherein the permission operation tool is located closer to a center in a vehicle width direction than the PTO drive stop operation tool.

8. The work vehicle according to claim 1, wherein the permission operation tool is configured to emit light when rotation of the rear PTO shaft after disembarkation or rotation of the central PTO shaft when moving backward is valid.

9. The work vehicle according to claim 8, further comprising:
   a PTO drive stop operation tool configured to switch between driving and stopping of the rear PTO shaft or the central PTO shaft,
   wherein, during rotation of the rear PTO shaft after disembarkation or during rotation of the central PTO shaft when moving backward, base on an operation to stop rotation of the rear PTO shaft or the central PTO shaft being performed to the PTO drive stop operation tool, the permission operation tool is configured to stop emitting light.

10. The work vehicle according to claim 1, further comprising:
    an auxiliary housing to which the permission operation tool is attached; and
    a base housing to which the auxiliary housing is attached.

11. The work vehicle according to claim 10, wherein
    a slit is formed in the base housing,
    a coupling is inserted in the slit, and
    the auxiliary housing is attached to the base housing by the coupling.

* * * * *